(12) United States Patent
Ljolje et al.

(10) Patent No.: US 8,428,443 B2
(45) Date of Patent: Apr. 23, 2013

(54) SYSTEMS AND METHODS OF PROVIDING MODIFIED MEDIA CONTENT

(75) Inventors: Andrej Ljolje, Morristown, NJ (US); Ann Syrdal, Morristown, NJ (US); Alistair Conkie, Morristown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1620 days.

(21) Appl. No.: 11/716,995

(22) Filed: Mar. 12, 2007

(65) Prior Publication Data
US 2008/0226256 A1  Sep. 18, 2008

(51) Int. Cl.
*H04N 5/783* (2006.01)
*G06F 3/00* (2006.01)

(52) U.S. Cl.
USPC ............. 386/343; 386/248; 386/291; 725/37; 715/720

(58) Field of Classification Search .......... 386/219–222, 386/230, 239, 248, 291, 343, 278, 329, 344, 386/350; 725/37–40, 86–92, 100, 105, 131–134, 725/135; 709/231; 715/720, 719
See application file for complete search history.

(56) References Cited

U.S. PATENT DOCUMENTS

| | | | |
|---|---|---|---|
| 5,140,473 A | 8/1992 | Murakami | |
| 5,367,330 A | 11/1994 | Haave et al. | |
| 5,459,506 A | 10/1995 | Bushnell | |
| 5,583,652 A | 12/1996 | Ware | |
| 5,583,937 A | 12/1996 | Ullrich et al. | |
| 5,664,044 A | 9/1997 | Ware | |
| 6,025,868 A | 2/2000 | Russo | |
| 6,360,202 B1 | 3/2002 | Bhadkamkar et al. | |
| 6,477,363 B1 | 11/2002 | Ayoub et al. | |
| 6,665,751 B1 | 12/2003 | Chen et al. | |
| 6,728,678 B2 | 4/2004 | Bhadkamkar et al. | |
| 6,732,366 B1 | 5/2004 | Russo | |
| 6,859,839 B1 * | 2/2005 | Zahorjan et al. | 709/231 |
| 6,868,224 B1 * | 3/2005 | Birmingham et al. | 386/343 |
| 6,907,570 B2 | 6/2005 | Amir et al. | |
| 7,134,131 B1 | 11/2006 | Hendricks et al. | |
| 7,149,593 B2 | 12/2006 | Wiser et al. | |
| 2002/0146234 A1 | 10/2002 | Mizuno | |
| 2004/0086262 A1 * | 5/2004 | Igawa et al. | 386/68 |
| 2004/0117841 A1 | 6/2004 | Urakoshi | |
| 2004/0267952 A1 * | 12/2004 | He et al. | 709/231 |
| 2006/0229904 A1 | 10/2006 | Hunter et al. | |
| 2006/0277316 A1 * | 12/2006 | Wang et al. | 709/231 |
| 2007/0022208 A1 * | 1/2007 | Hashimoto et al. | 709/231 |
| 2007/0098357 A1 * | 5/2007 | McEnroe et al. | 386/68 |
| 2007/0271388 A1 * | 11/2007 | Bowra et al. | 709/231 |

(Continued)

FOREIGN PATENT DOCUMENTS

JP   2002-335472   * 11/2002

*Primary Examiner* — Thai Tran
*Assistant Examiner* — Mishawn Dunn
(74) *Attorney, Agent, or Firm* — Toler Law Group, PC

(57) ABSTRACT

A method of providing modified media content is disclosed that includes providing media content to a destination device via a network, where the media content comprises video data and audio data have a first viewing rate. The method further includes receiving data indicating a selection of a second viewing rate via the network and modifying the media content to produce modified media content having approximately the second viewing rate. The modified media content includes modified video data and modified audio data synchronized at approximately the second viewing rate.

28 Claims, 7 Drawing Sheets

U.S. PATENT DOCUMENTS

| | | | |
|---|---|---|---|
| 2007/0288971 A1* | 12/2007 | Cragun et al. | 725/90 |
| 2008/0066137 A1* | 3/2008 | Cox et al. | 725/135 |
| 2008/0107402 A1* | 5/2008 | Angiolillo et al. | 386/124 |
| 2008/0222636 A1* | 9/2008 | Wang et al. | 718/100 |
| 2010/0275121 A1* | 10/2010 | Johnson | 715/719 |
| 2012/0057851 A1* | 3/2012 | Yoshimine | 386/278 |

* cited by examiner

SYSTEMS AND METHODS OF PROVIDING MODIFIED MEDIA CONTENT

FIELD OF THE DISCLOSURE

The present disclosure relates to systems and methods of providing modified media content.

BACKGROUND

Media content may be viewed at a recorded rate, at an increased viewing rate in order to scan for particular portions, or at a slowed rate in order to more closely study the content. A system may allow a user to select an option to view the media content at twice the recorded speed, for example, and the user typically views the sped-up media content without an accompanying audio track. The system may also allow the user to select another option to view the media content at one-half the recorded speed, without an accompanying audio track. Hence, there is a need for systems and methods of providing modified media content.

DETAILED DESCRIPTION OF THE DRAWINGS

Figure 1:
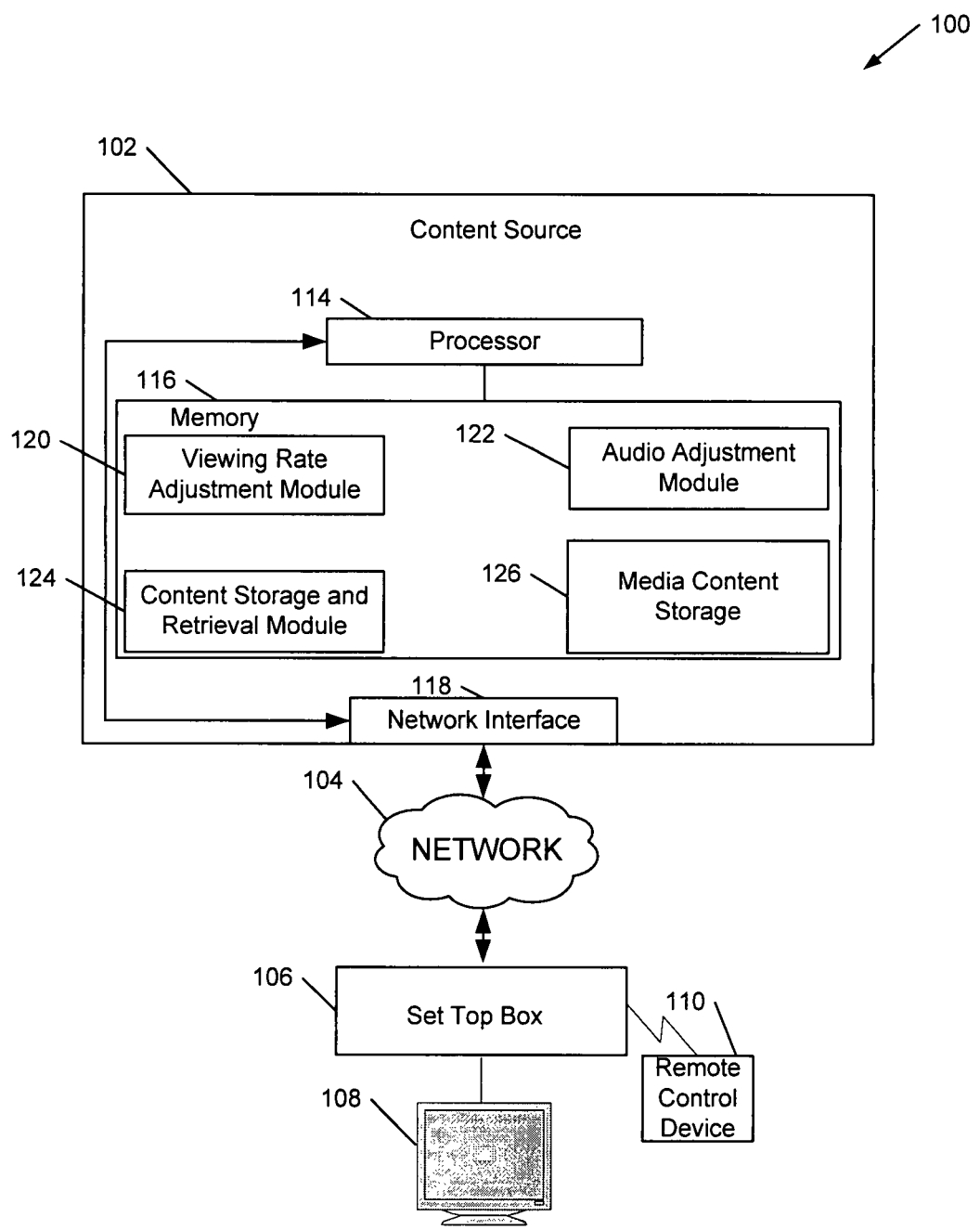
FIG. 1 is a block diagram of a particular illustrative embodiment of a system to provide modified media content.

In a particular embodiment, a set-top box device is disclosed that includes a processor and a memory device accessible to the processor. The memory device includes a media content storage to store media content comprising video data and audio data having a recorded rate. The memory further includes a viewing rate module executable by the processor to modify the media content to produce modified media content having a user-selected viewing rate. The modified media content includes modified video data and modified audio data that are approximately synchronized at the viewing rate.

In another particular embodiment, a system is disclosed that includes an interface, a processor, and a memory device. The interface is responsive to a network to receive data related to a user-selected viewing rate from a set-top box device, and the processor is coupled to the interface. The memory device is accessible to the processor and includes a media content storage to store media content including video data and audio data having a recorded rate. The memory device further includes a media content storage and retrieval module executable by the processor to retrieve and store user selected media content in the media content storage. Additionally, the memory device includes a viewing rate module executable by the processor to receive the user-selected viewing rate, to modify the video data to produce modified video data having the user-selected viewing rate, to modify the audio data to produce modified audio data having the user-selected viewing rate, and to synchronize the modified video data and modified audio data to produce modified media content.

In another particular embodiment, a computer-readable medium tangibly embodies a set of instructions that are executable by a processor to perform a method of providing media content. The method includes receiving media content from a content source at a set-top box device via a network, where the media content includes video data and audio data having a recorded rate at a set-top box device from a content source via a network. The method also includes receiving a user selection of a viewing rate, where the user selection includes a numerical input. Further, the method includes modifying the media content to produce modified media content having the viewing rate, where the modified media content includes modified video data and modified audio data synchronized at the viewing rate.

In another particular embodiment, a method of providing modified media content is disclosed that includes providing media content to a destination device via a network, where the media content comprises video data and audio data have a first viewing rate. The method further includes receiving data indicating a selection of a second viewing rate via the network and modifying the media content to produce modified media content having approximately the second viewing rate. The modified media content includes modified video data and modified audio data synchronized at approximately the second viewing rate.

In still another particular embodiment, a method of providing media content is disclosed that includes receiving media content from a content source at a set-top box device via a network, where the media content includes video data and audio data having a recorded rate. The method also includes receiving a user selection of a viewing rate, where the user selection includes a numerical input. Further, the method includes modifying the media content to produce modified media content having the viewing rate. The modified media content includes modified video data and modified audio data synchronized at the viewing rate.

FIG. 1 is a block diagram of a particular illustrative embodiment of a system 100 to provide modified media content. The system 100 includes a set-top box device 106 that communicates with a content source 102 via a network 104. In a particular embodiment, the content source 102 can be a video server or other content source of an Internet Protocol Television (IPTV) system. In an illustrative embodiment, the network 104 can be an access network of an IPTV system. The set-top box device 106 communicates with a remote control device 110. Further the set-top box device 106 provides video, audio, or any combination thereof to a display device 108.

The content source 102 includes a processor 114 and memory 116 accessible to the processor. The content source 102 further includes a network interface 118 responsive to the network 104. The memory 116 includes a viewing rate adjustment module 120 executable by the processor 114 to adjust a viewing rate of selected media content. The memory 116 further includes an audio adjustment module 122 executable by the processor 114 to preserve a pitch associated with the audio as the speech rate of the audio is changed. The memory 116 further includes a content storage and retrieval module 124 to store media content at a media content storage 126 and to retrieve selected media content from the media content storage 126.

In a particular illustrative embodiment, a user may request media content via the remote control device 110, which communicates with the set-top box device 106. The media content may include video data and audio data having a first viewing rate. In a particular embodiment, the user may request the media content from a webpage interface via the network 104. The set-top box device 106 may send data indicating the request to the content source 102 via the network 104. The content source 102 may store the requested media content at the media content storage 126. The processor 114 may retrieve the requested media content by executing instructions associated with in the content storage and retrieval module 124. The processor 114 may send the requested media content to the set-top box device 106. The user may view the requested media content at the display device 108.

The user may initiate a request to change from the first viewing rate to a second viewing rate. In an illustrative embodiment, the user may enter the second viewing rate via the remote control device 110. The set-top box device 106 may receive a user entry specifying the second viewing rate and send data related to the user entry to the content source 102. The content source 102 may receive the data related to the user entry. In response to receiving the data related to the user entry, the processor 114 may modify the media content to produce modified media content having approximately the second viewing rate, by executing instructions associated with the viewing rate adjustment module 120. The modified media content may include modified video data and modified audio data. The processor 114 may synchronize the modified video data and the modified audio data by executing instructions associated with the viewing rate adjustment module 120. Synchronizing is a process for aligning the modified audio data with corresponding images within the modified video data.

For example, in a particular illustrative non-limiting embodiment, if a portion of the media content features a scene in which a person is delivering a speech, the synchronized modified media content may contain modified video data featuring the scene of the person delivering the speech, and modified audio data corresponding with the images of the modified video data.

In a particular embodiment, the processor 114 may adjust a pitch of the modified audio data, by executing instructions associated with the audio adjustment module 122. In a particular embodiment, a pitch adjustment may be applied that is based on a first viewing rate and a second viewing rate. In an illustrative embodiment, the processor 114 may adjust the pitch so that each voice within the modified audio data sounds similar to a corresponding voice within audio data of the media content before modification. In a particular illustrative example, the pitch adjustment may preserve the pitch of the audio data. The audio adjustment module 122 can be executed by the processor 114 to preserve the pitch of the audio by maintaining the original pitch, the formants, and other aspects of speech that reflect the original speech characteristics of the speaker, allowing the modified audio data to sound like "natural speech." In similar fashion, the processor 114 may adjust the pitch associated with non-speech sounds included in the modified audio data to preserve the pitch of the audio data before modification.

There are a variety of techniques that may be employed for preserving a pitch of speech while changing a speaking rate, familiar to those skilled in the art. Techniques that may be employed include: time domain overlap and add techniques such as Waveform Similarity OverLap-Add (WSOLA) Technique and Pitch Synchronous OverLap Add (PSOLA) Technique; frequency domain techniques such as Linear Predictive Coding (LPC), and Harmonic Plus Noise Model (HNM) techniques; other pitch correcting techniques; or any combination thereof.

The content source 102 may provide the modified media content to the set-top box device 106 via the network 104. The user may view the modified media content at the display device 108. The user may hear the modified audio data via the display device 108.

In a particular illustrative embodiment, the user may request the second viewing rate to be faster than the recorded rate of the media content. For example, the second viewing rate is 1.2 times as fast as the recorded rate, i.e., 20% faster than the recorded rate. The modified video data may be viewed at a rate of 1.2 times the recorded rate and the modified audio data may be heard at a rate of 1.2 times the recorded rate. With pitch adjustment applied to the modified audio data, the pitch of the modified audio rate may sound like natural speech, i.e. speech having preserved pitch characteristics that are similar to the speech as recorded.

In a particular illustrative embodiment, the user may decide to change the viewing rate to another viewing rate that is 1.5 times the recorded rate, i.e., 50% faster than the recorded rate. The content source may provide the modified media content at a viewing rate of 1.5 times the recorded rate. The set-top box device 106 may provide the modified media content to the display device 108. The user may view the modified video data at 1.5 times the recorded rate and hear the accompanying audio soundtrack at 1.5 times the recorded rate. The modified audio data may have a pitch adjustment to preserve the recorded pitch in the modified audio data so that the speech sounds natural, i.e., each voice heard within in its expected pitch range, rather than at a higher pitch than recorded.

In general, a user may have flexibility in viewing the media content. For example, the user may select a second viewing rate that is faster than the recorded rate or slower than the recorded rate. In an illustrative example, the second viewing rate may be less than twice the recorded rate. In another illustrative example, the viewing rate may be less than the recorded rate, and the video data may appear as if actions are occurring in "slow motion." The accompanying modified audio data may be delivered synchronously with the modified video data, and the pitch of the modified audio data may be adjusted to preserve the pitch range of the media content as recorded.

In an illustrative example, the user may choose to increase the viewing rate incrementally. For example, if selected media content has a recorded viewing rate, the user may adjust the viewing rate incrementally, such as by increments of 0.1, 0.05, other increments, or any combination thereof. For example, a user may adjust the viewing rate to approximately 1.15 times the recorded viewing rate (approximately 15% faster than the recorded viewing rate). In this manner, the user may "fine tune" the viewing rate. In a particular illustrative embodiment, the increments may be defined within the set-top box device 106 or at a content source 102, and a user may select a desired viewing rate by depressing a key of the remote control device 110 multiple times, until the desired viewing rate is selected. In another particular illustrative embodiment, a user may enter a desired viewing rate by providing a numerical input.

In a particular illustrative embodiment, the set-top box device 106 may receive a user-selected viewing rate via the remote control device 110, and the set-top box device 106 may transmit data related to the user-selected viewing rate to the content source 102. At some point in a presentation of the modified media content, the user may decide to return to the original viewing rate. By entering the original viewing rate, i.e., viewing rate of 1.0 times the recorded rate, the media content delivered will no longer be modified, and the content source 102 can provide the media content at the original recorded rate to the set-top box device 106.

In a particular illustrative embodiment, a playback rate may be selected from a list of available media content, where each item in the list has a different playback rate. In a particular embodiment, a content provider, such as the content source 102, may provide a media content selection having a replay speed that is slower than a recorded rate and a second media content selection having a replay speed that is faster than a recorded rate. For example, a content provider may offer pre-recorded lectures, teaching materials, and other learning content at a slow rate (i.e. a note-taking speed). The content provider may also offer pre-recorded lectures, teaching materials, and other learning content at a faster rate (i.e. a review/refresh speed). The content source 102 may provide a selectable menu that includes the first and the second media content selections from which a user may choose a particular selection, allowing the user to realize the benefits of the media content having the adjusted playback rate without direct control of the playback rate.

Figure 2:
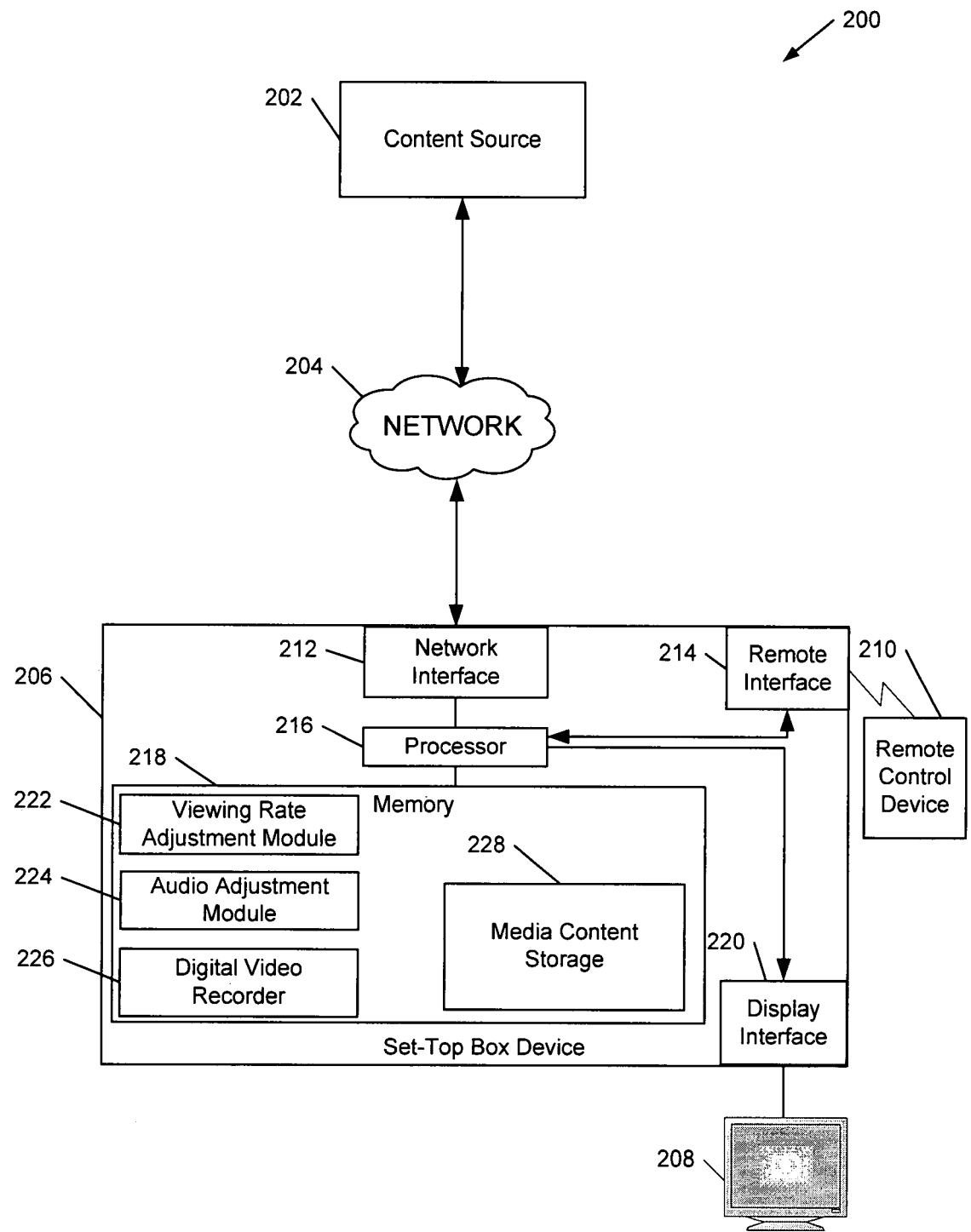
FIG. 2 is a block diagram of a second particular illustrative embodiment of a system to provide modified media content.

FIG. 2 is a block diagram of a second particular illustrative embodiment of a system 200 to provide modified media content. The system 200 includes a set-top box device 206 that communicates with a content source 202 via a network 204. In a particular embodiment, the content source 202 can be a video server or other content source of an Internet Protocol Television (IPTV) system. In an illustrative embodiment, the network 204 can be an access network of an IPTV system. The set-top box device 206 communicates with a remote control device 210. Additionally, the set-top box device 206 provides video, audio, or any combination thereof to a display device 208. The set-top box device 206 includes a network interface 212 that is responsive to the network 204. The set-top box device 206 also includes a processor 216 that is coupled to the network interface 212 and a memory 218 that is accessible to the processor 216. The set-top box device 206 communicates with the remote control device 210 via a remote interface 214 and provides video, audio or any combination thereof to the display device 208 via a display interface 220.

In a particular illustrative embodiment, a user may select media content via the remote control device 210. In an illustrative embodiment, the user may select the media content via an electronic program guide (EPG) displayed at the display device 208. The set-top box device 206 may request the selected media content from the content source 202 via the network 204. The set-top box device 206 may download the selected media content and store the selected media content at the media content storage 228.

In a particular illustrative embodiment, the user may view the selected media content at a recorded rate. The recorded rate, also referred to herein as a standard viewing rate, is an unmodified viewing rate. In a particular embodiment, the user may enter a viewing rate selection via the remote control device. The viewing rate selection may be faster than the standard viewing rate or slower than the standard viewing rate. For example, the viewer may enter a viewing rate selection that is faster than the standard viewing rate in order to scan the media content in search of a particular portion.

The set-top box device 206 may receive the viewing rate selection via the remote interface 214. In response to receiving the viewing rate selection, the processor 216, executing instructions associated with the viewing rate module 222, may modify the video data and the audio data, producing modified media content having the selected viewing rate. Modifying the media content may include removing or adding frames from the video data, and removing or adding portions of the audio data. The processor 216 may synchronize the modified video data and modified audio data, producing modified media content that is synchronized. In a particular embodiment, the processor 216 may execute instructions associated with the audio adjustment module 224 to preserve a pitch of the audio data. The modified audio data that is pitch-adjusted and synchronized with the modified video data can be delivered to the display device 208 via the display interface 220. In a particular illustrative embodiment, the user may view the media content at a selected viewing rate of 1.2 times the standard rate, including the modified video data and the modified video data with pitch preservation to eliminate a "chipmunk effect," in which reproduced voices are pitched higher than originally recorded.

In a particular illustrative embodiment, the user may enter a viewing rate selection that is slower than the standard viewing rate. In response to the selected viewing rate, the set-top box device 206 may produce modified media content that includes modified video data and modified audio data having the slower rate. The set-top box device 206 may adjust the pitch of the modified audio data so that voices are in a pitch range that approximates the pitch range associated with the standard viewing rate, i.e., preserving the pitch as originally recorded. The modified media content delivered to the display device 208 may then appear to move in slow motion, with the modified audio data synchronized with the modified video data. While the modified audio data may be received at a slower rate, the voice pitch range may be preserved as it was recorded, rather than resembling a "lethargic" pitch typically associated with a slowed-down audio track.

In a particular illustrative embodiment, the set-top box device 206 may download media content and store the media content at the digital video recorder 226, where the media content can reside until the user wishes to view it. The processor 216 may retrieve the recorded media content and may modify the media content in response to receiving a user-selected viewing rate. In a particular illustrative embodiment, the processor 216 may modify the media content stored in the digital video recorder 226, or in media content storage 228, and store modified media content in media content storage 228 for playback at a future time.

In a particular illustrative embodiment, the user may be able to select viewing rates in discrete increments of the user's choosing. Hence, the user may enter successive viewing rate selections and view the modified content displayed at successive viewing rates. The viewer may be able to fine-tune the viewing rate to a viewing rate, other than the recorded rate, that is comfortable for the viewer, and may listen to the accompanying audio data. In an illustrative embodiment, the viewer may select a viewing rate that is between one and two times the standard viewing rate. In another illustrative embodiment, the viewer may choose a viewing rate selection that is slower than the standard viewing rate to watch a slow-motion version of the video data and hear accompanying audio data slowed down, synchronized and corrected for pitch preservation.

Figure 3:
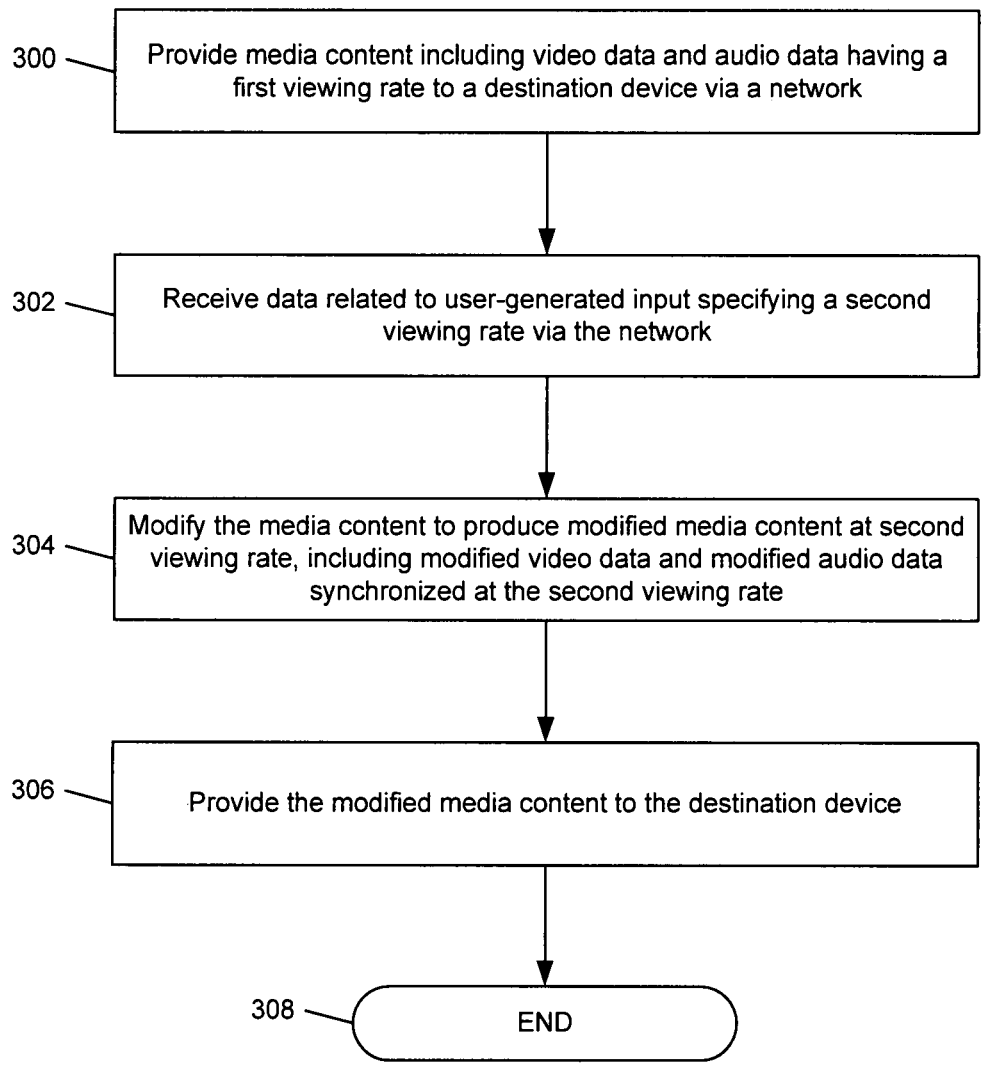
FIG. 3 is a flow diagram of a particular illustrative embodiment of a method of providing modified media content.

FIG. 3 is a flow diagram of a particular embodiment of a method of modifying media content. At block 300, a content source may provide media content including video data and audio data having a first viewing rate to a destination device via a network. Moving to block 302, the content source may receive data related to a user generated input specifying a second viewing rate via the network. Proceeding to block 304, the content source may modify the media content to produce modified media content at the second viewing rate, including modified video data and modified audio data synchronized at the second viewing rate. In a particular embodiment, the content source may also apply a pitch adjustment to the modified audio data. Moving to block 306, the content source may provide the modified media content to the destination device. The method terminates at 308.

Figure 4:
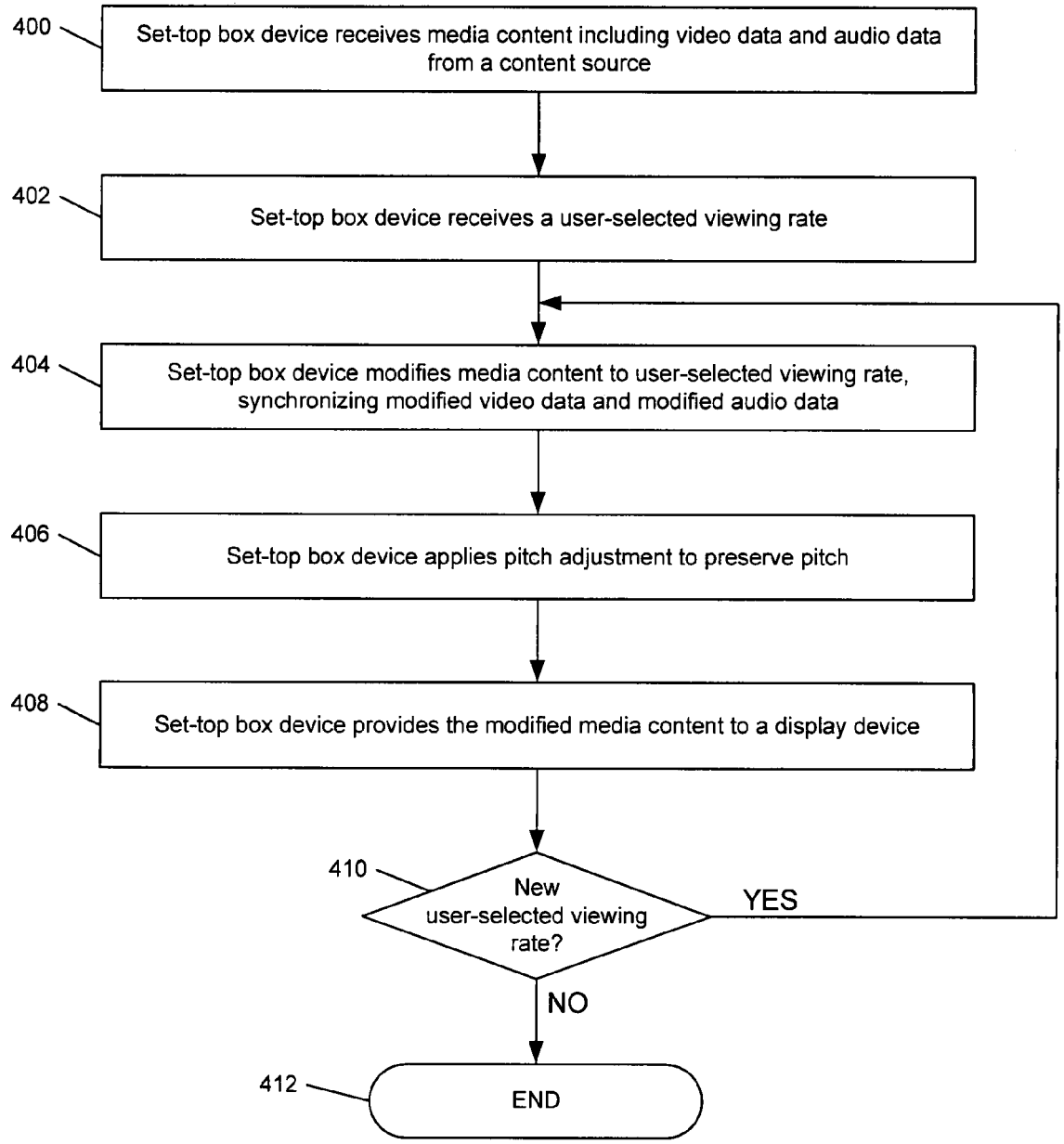
FIG. 4 is a flow diagram of a second particular illustrative embodiment of a method of providing modified media content.

FIG. 4 is a flow diagram of a second particular illustrative embodiment of a method of modifying media content. At block 400, a set-top box device receives media content including video data and audio data from a content source. Moving to block 402, the set-top box device receives a user-selected viewing rate. Proceeding to block 404, the set-top box device modifies the media content to produce modified media content having the user-selected viewing rate, including modified video data and modified audio data approximately synchronized at the viewing rate. Moving to block 406, in a particular embodiment, the set-top box device applies a pitch adjustment to the audio data to preserve pitch, providing modified audio data having a pitch similar to audio data having a standard viewing rate. Proceeding to block 408, the set-top box device provides the modified media content to a display device.

Moving to decision block 410, the set-top box device determines whether it has received a user selection of a new viewing rate. If a new viewing rate is received, the method returns to block 404 and the set-top box device modifies the media content to the new viewing rate, synchronizing the modified video and audio. Thus, the user may fine-tune the viewing rate. Returning to decision block 410, if a new viewing rate is not received, the method terminates at 412.

Figure 5:
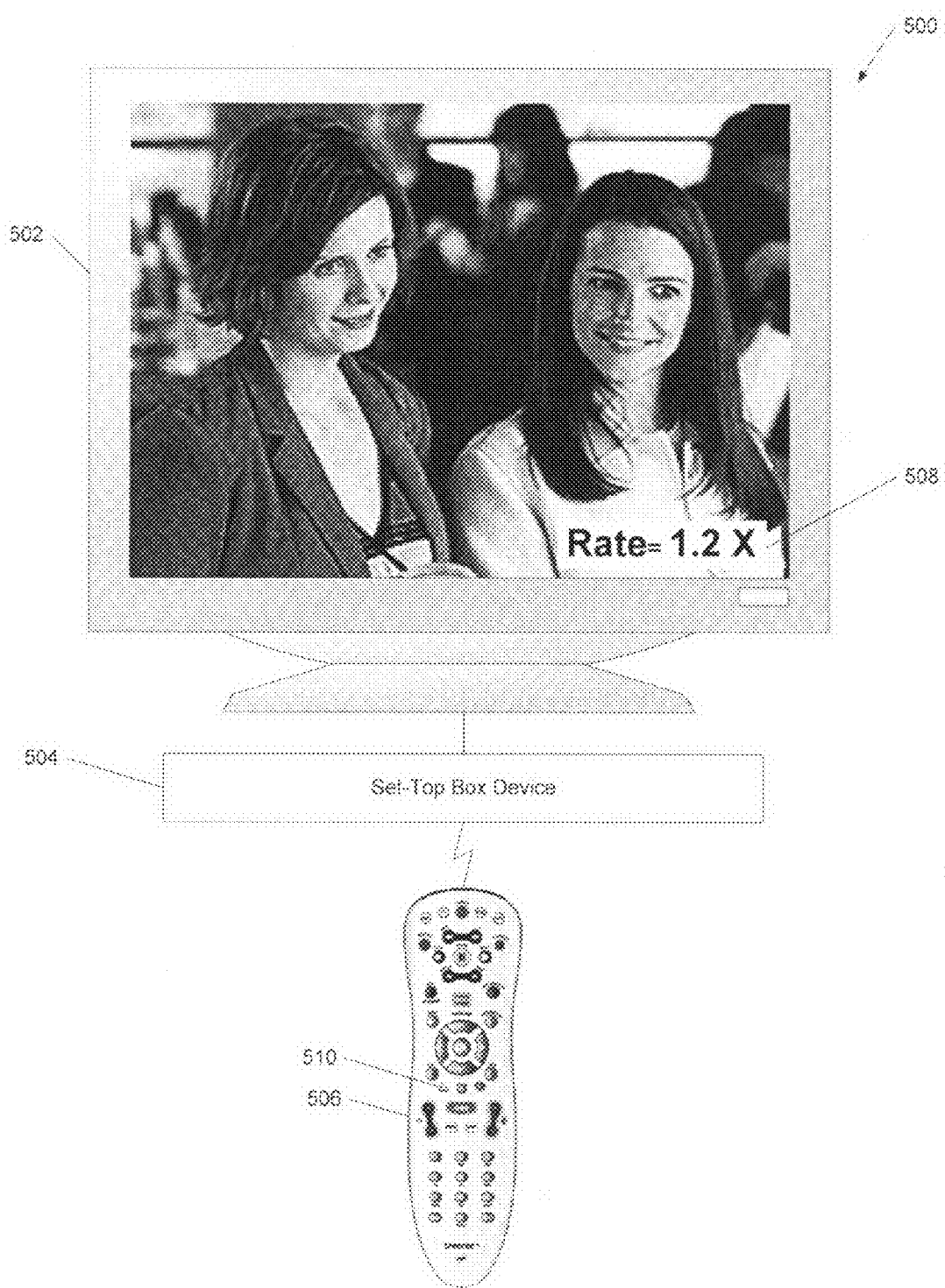
FIG. 5 is a diagram of a particular illustrative embodiment of a user interface to provide modified media content.

FIG. 5 is a diagram of a particular illustrative embodiment of a user interface to provide modified media content. A system 500 includes a display device 502, a set-top box device 504, and a remote interface 506. In operation, a user may enter a viewing rate selection via the remote interface 506, through depressing a viewing rate button 510 on the remote interface 506. The set-top box device 504 may receive the viewing rate selection from the remote input device 506 and may modify media content, producing modified media content at the selected viewing rate. The set-top box device 504 may output the modified media content to the display device 502, and may also output viewing rate data 508 for display by the display device. In a particular illustrative example shown, the viewing rate is 1.2 times a standard rate. In the example shown, the user may view the media content at the viewing rate of 1.2 times the standard rate, with the accompanying audio data sped-up to the rate of 1.2 times the recorded rate and pitch-adjusted to enhance intelligibility of speech in the audio data.

In a particular illustrative embodiment, depressing the button 510 successive times may increment or decrement the viewing rate by a fixed differential. For instance, the differential may be 0.2 times the recorded rate, and successively depressing the button 510 may change the viewing rate to 1.2, 1.4, 1.6, etc. times the recorded rate.

Figure 6:
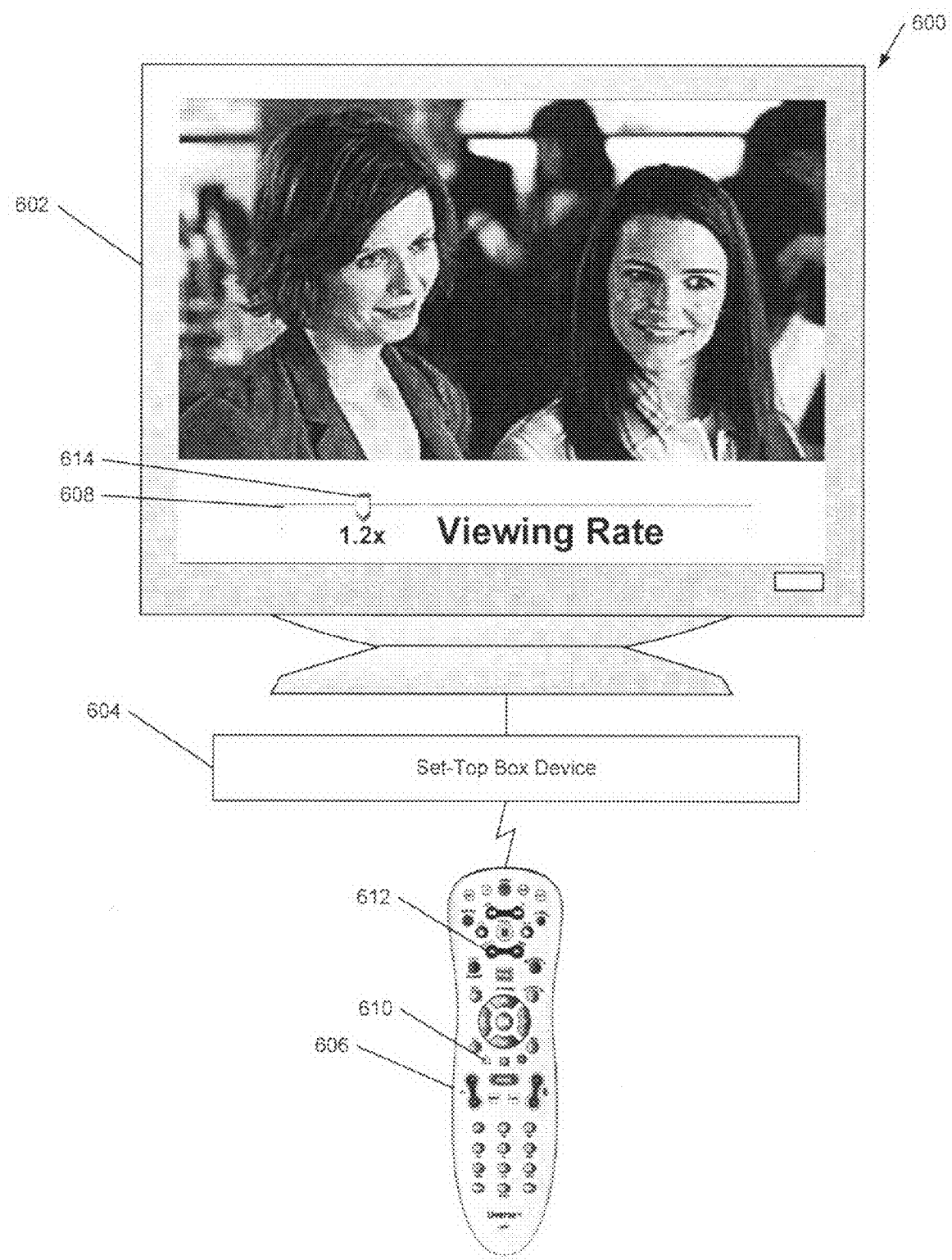
FIG. 6 is a diagram of a second particular illustrative embodiment of a user interface to provide modified media content.

FIG. 6 is a diagram of a second particular illustrative embodiment of a user interface to provide modified media content. A system 600 includes a display device 602, a set-top box device 604, and a remote input device 606. In operation, a user may depress a viewing rate selection button 610, resulting in a viewing rate slider bar 608 appearing at the bottom of the display device screen. In the example shown, the selected viewing rate is 1.2, with the numerical value of the selected viewing rate appearing beneath a sliding pointer 614. An increment/decrement button 612 can be used to increase or decrease a selected viewing rate, with a corresponding change in position of the sliding pointer 614 on the slider bar 608. In another particular illustrative embodiment, the user interface may have another visual form, which may conform to a user interface for adjusting other variables of the display device, e.g., brightness, contrast, volume, or other variables. For example, a user interface may include a plurality of soft knobs, soft pushbuttons, or other visual, audible or other representations. In another particular illustrative embodiment, the interface for adjusting the replay rate could include a numeric input, an adjustable spectrum, other inputs, or any combination thereof.

Figure 7:
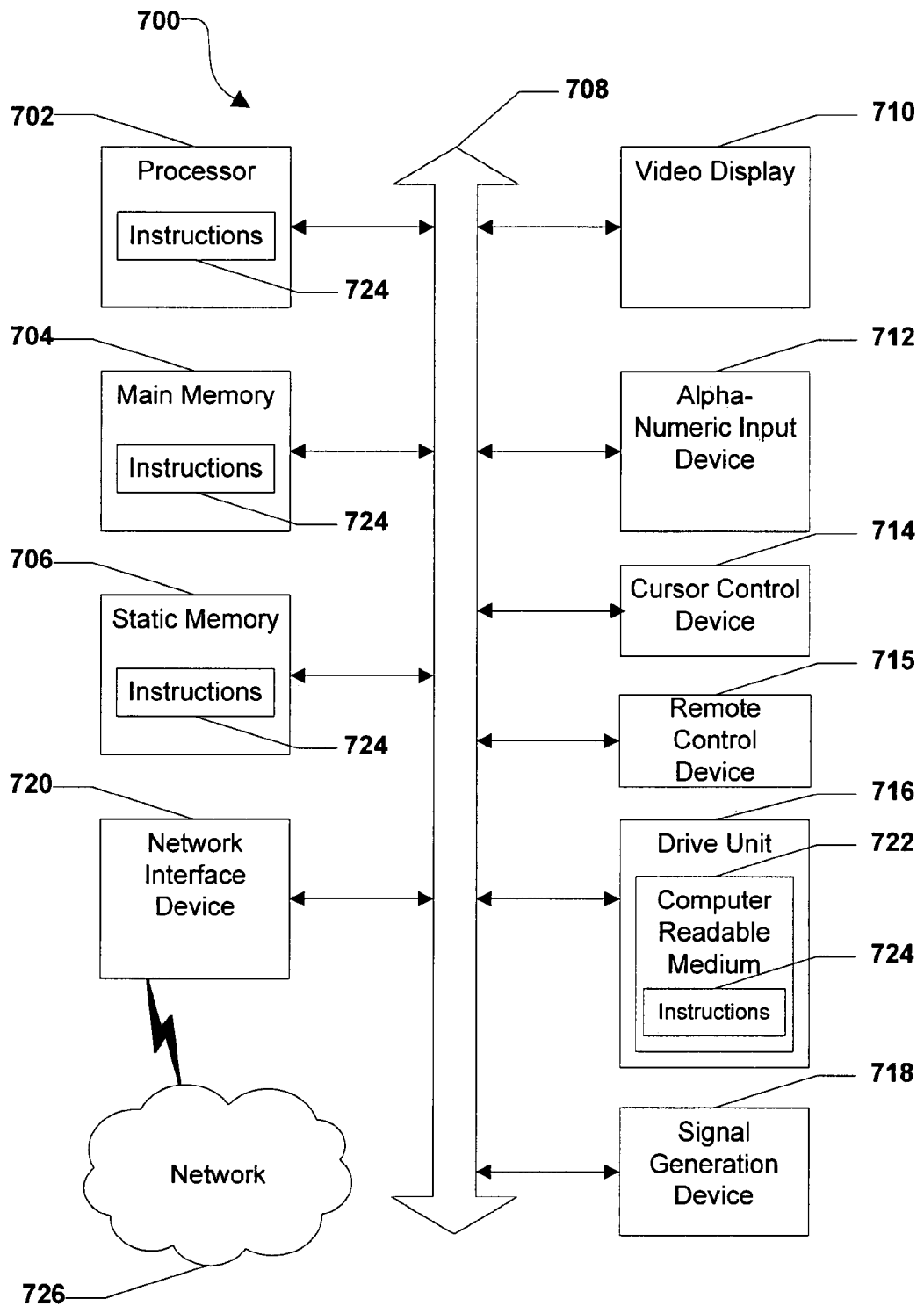
FIG. 7 is a block diagram of an embodiment of a general computer system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. The computer system 700, or any portion thereof, may operate as a standalone device or may be connected, e.g., using a public network, such as the Internet, or a private network, to other computer systems or peripheral devices, including one or more content sources or set-top box devices, as depicted in FIGS. 1 and 2.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box device (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. Further, the computer system 700 can include a wireless input device 715, e.g., a remote control device. When the computer system 700, or any portion thereof, is embodied in a set-top box device, the cursor control device 714 can be a remote control device. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal; so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   providing media content to a destination device via a network, wherein the media content comprises video data and audio data having a first viewing rate;
   providing a slide bar having a sliding pointer, wherein the entire slide bar is divided into a plurality of increments, wherein each increment is associated with a corresponding playback rate, wherein any two consecutive increments of the plurality of increments define a pair of consecutive increments, wherein a first playback rate of a first increment of a first pair of consecutive increments and a second playback rate of a second increment of the first pair of consecutive increments differ by a particular playback rate amount, wherein each pair of consecutive increments is associated with the particular playback rate amount, and wherein a second viewing rate corresponds to a position of the sliding pointer on the slide bar;
   receiving data indicating a first selection of the second viewing rate via the network; and
   modifying the media content to produce modified media content having approximately the second viewing rate, wherein the second viewing rate differs from the first viewing rate by a differential rate that is approximately ten percent or less of the first viewing rate, and wherein the modified media content comprises modified video data and modified audio data synchronized at approximately the second viewing rate.

2. The method of claim 1, further comprising providing the modified media content to the destination device.

3. The method of claim 1, wherein the first viewing rate is equal to a recorded rate of the media content.

4. The method of claim 1, wherein the differential rate is selected by a user.

5. The method of claim 1, wherein the second viewing rate is greater than the first viewing rate.

6. The method of claim 1, wherein the second viewing rate is less than the first viewing rate.

7. The method of claim 1, wherein modifying the media content further comprises adjusting the audio data by adding or removing audio data to achieve synchronization.

8. The method of claim 1, wherein the slide bar provides a range between a recorded viewing rate of the media content and twice the recorded viewing rate of the media content.

9. The method of claim 1, wherein the sliding pointer is positionable at each increment of the plurality of increments.

10. The method of claim 1, wherein the first viewing rate is selected by a user and wherein the slide bar is provided in response to receiving data indicating a second selection of the first viewing rate via the network.

11. The method of claim 1, further comprising:
    providing a first option to produce the modified media content at a faster rate of speed than the first viewing rate; and
    providing a second option to produce the modified media content at a slower rate of speed than the first viewing rate.

12. The method of claim 1, wherein the slide bar is limited to a range of from one times the first viewing rate to two times the first viewing rate.

13. A method comprising:
    receiving media content from a content source at a set-top box device via a network, wherein the media content includes video data and audio data having a recorded rate;
    providing a slide bar having a sliding pointer, wherein the entire slide bar is divided into a plurality of increments, wherein each increment is associated with a corresponding playback rate, wherein any two consecutive increments of the plurality of increments define a pair of consecutive increments, wherein a first playback rate of a first increment of a first pair of consecutive increments and a second playback rate of a second increment of the first pair of consecutive increments differ by a particular playback rate amount of approximately ten percent or less of the recorded rate, wherein each pair of consecutive increments is associated with the particular playback rate amount, and wherein a viewing rate corresponds to a position of the sliding pointer on the slide bar;
    receiving a user selection of the viewing rate; and
    modifying the media content to produce modified media content having the viewing rate, wherein the modified media content includes modified video data and modified audio data synchronized at the viewing rate.

14. The method of claim 13, wherein modifying the media content further comprises applying a pitch adjustment to the modified audio data, and wherein the user selection is associated with a numerical input.

15. The method of claim 13, wherein the content source is an interne protocol television source.

16. The method of claim 13, wherein the network is an internet protocol television access network.

17. The method of claim 13, wherein the particular playback rate amount is approximately five percent of the recorded rate.

18. A set-top box device comprising:
    a processor; and
    a memory device accessible to the processor, wherein the memory device includes:
       a media content storage to store media content comprising video data and audio data having a recorded rate, wherein a first viewing rate is associated with the recorded rate; and
       a viewing rate module executable by the processor to:
          provide a slide bar having a sliding pointer, wherein the entire slide bar is divided into a plurality of increments, wherein each increment is associated with a corresponding playback rate, wherein any two consecutive increments of the plurality of increments define a pair of consecutive increments, wherein a first playback rate of a first increment of a first pair of consecutive increments and a second playback rate of a second increment of the first pair of consecutive increments differ by a particular playback rate amount of approximately ten percent or less of the first viewing rate, wherein each pair of consecutive increments is associated with the particular playback rate amount, and wherein a second viewing rate corresponds to a position of the sliding pointer on the slide bar;
  receive a user selection of the second viewing rate; and
  modify the media content to produce modified media content having the second viewing rate, the modified media content comprising modified video data and modified audio data approximately synchronized at the second viewing rate.

19. The set-top box device of claim 18, further comprising an output interface to provide the modified audio data and the modified video data to a display device.

20. The set-top box device of claim 19, further comprising a digital video recorder to store the media content and to provide the media content to the processor at the recorded rate, the digital video recorder executable by the processor.

21. The set-top box device of claim 18, wherein the memory device further includes an audio adjustment module executable by the processor to adjust a pitch of the audio data at the second viewing rate.

22. The set-top box device of claim 18, wherein the particular playback rate amount is approximately five percent of the first viewing rate.

23. A system comprising:
  an interface responsive to a network to receive data related to a user-selected viewing rate from a set-top box device;
  a processor coupled to the interface; and
  a memory device accessible to the processor, wherein the memory device includes:
    media content storage to store media content including video data and audio data having a recorded rate;
    a media content storage and retrieval module executable by the processor to retrieve and store user selected media content in the media content storage; and
    a viewing rate module executable by the processor to:
      provide a slide bar having a sliding pointer, wherein the entire slide bar is divided into a plurality of increments, wherein each increment is associated with a corresponding playback rate, wherein any two consecutive increments of the plurality of increments define a pair of consecutive increments, wherein a first playback rate of a first increment of a first pair of consecutive increments and a second playback rate of a second increment of the first pair of consecutive increments differ by a particular playback rate amount of less than ten percent of the recorded rate, wherein each pair of consecutive increments is associated with the particular playback rate amount, and wherein the user-selected viewing rate corresponds to a position of the sliding pointer on the slide bar;
      receive the user-selected viewing rate;
      modify the video data to produce modified video data having the user-selected viewing rate;
      modify the audio data to produce modified audio data having the user-selected viewing rate; and
      synchronize the modified video data and modified audio data to produce modified media content.

24. The system of claim 23, wherein the viewing rate module further comprises instructions to preserve a pitch by applying a pitch adjustment to the modified audio data.

25. The system of claim 24, wherein the pitch adjustment is based at least in part on the user-selected viewing rate and the recorded rate.

26. The system of claim 23, wherein the particular playback rate amount is approximately five percent of the recorded rate.

27. A computer-readable storage device comprising instructions that are executable by a processor to perform a method comprising:
  receiving media content from a content source at a set-top box device via a network, wherein the media content includes video data and audio data having a recorded rate;
  providing a slide bar having a sliding pointer, wherein the slide bar is divided into a plurality of increments, wherein each increment is associated with a corresponding playback rate, wherein any two consecutive increments of the plurality of increments define a pair of consecutive increments, wherein a first playback rate of a first increment of a first pair of consecutive increments and a second playback rate of a second increment of the first pair of consecutive increments differ by a particular playback rate amount of less than ten percent of the recorded rate, and wherein a viewing rate corresponds to a position of the sliding pointer on the slide bar;
  receiving a user selection of the viewing rate; and
  modifying the media content to produce modified media content having the viewing rate, wherein the modified media content includes modified video data and modified audio data synchronized at the viewing rate.

28. The computer-readable storage device of claim 27, wherein the particular playback rate amount is approximately five percent of the recorded rate.

* * * * *